United States Patent [19]
Brock et al.

[11] 3,741,652

[45] June 26, 1973

[54] METHOD FOR PRODUCING PLATES HAVING ENLARGED HALFTONE PATTERNS AND ARTICLE PRODUCED BY SAID PROCESS

[75] Inventors: Blanchard M. Brock, Rochester, N.Y.; Paul R. Josephson, Jr., Fort Collins, Colo.

[73] Assignee: Eastman Kodak Company, Rochester, N.Y.

[22] Filed: Feb. 16, 1972

[21] Appl. No.: 226,745

[52] U.S. Cl. .................... 355/132, 96/44, 355/122, 355/133
[51] Int. Cl. ............................................. G03b 27/02
[58] Field of Search .................... 355/132, 133, 122; 96/44

[56] References Cited
UNITED STATES PATENTS

| | | | |
|---|---|---|---|
| 1,709,320 | 4/1929 | Powers | 355/132 |
| 1,677,965 | 7/1928 | Fruwirth | 96/44 |

OTHER PUBLICATIONS

"A Method for Studying Possible Local Distortions in Aerial Films." by J. M. Calhoun et al. Photogrammetric Engineering, Sept. 1960, pgs. 661–672.

*Primary Examiner*—Richard L. Moses
*Attorney*—W. T. French et al.

[57] ABSTRACT

An unexposed lithographic-type photographic film or plate is placed a small distance away from a master halftone "screen," and the film or plate is exposed through the screen with the use of a point source of substantially monochromatic light. An "enlarged" image of the screen, i.e., one showing halftone dots, is formed by diffraction on the film or plate. The degree of enlargement, i.e., the increase in spacing between centers of adjacent halftone dots, is determined by the ratio of the light source to master screen, and light source to photographic film or plate distances. The enlarged screens are useful in the moire method for determining the dimensional stability of photographic films.

2 Claims, 3 Drawing Figures

METHOD FOR PRODUCING PLATES HAVING ENLARGED HALFTONE PATTERNS AND ARTICLE PRODUCED BY SAID PROCESS

BACKGROUND OF THE INVENTION

1. Field of the Invention

This invention relates to a method of producing "enlarged" halftone plates, i.e., plates having increased spacing between centers of adjacent halftone dots or lines and to articles produced by said method. The enlarged plates are useful in determining the dimensional stability of photographic films. The dimensions of film are affected, for example, by how it is developed, how it is dried after it is developed, and the humidity of the atmosphere in which it is stored. Ascertaining the dimensional stability of a film is particularly important in gaining accurate information from, say, aerial photographs wherein actual distances between points depicted on the photograph are desired to be known.

2. Description Relative to the Prior Art

In the art of measuring the dimensional changes in photographic films, it is known to measure such changes by the use of moire patterns. Moire patterns are fomred by superimposing upon a developed halftone pattern on the film to be tested, a second halftone pattern formed on, say, a glass substrate. The term "moire patterns" refers to the pattern of light and dark areas formed by the mechanical interference of the light and dark areas in the two halftones. In an article by Adelstein and Leister, entitled *Measurement of Dimensional Changes of Graphic Arts Photographic Film*, published in TAGA Proceeding, 1966, pages 47 through 60, the contents of which are incorporated herein by reference thereto, a technique is described for providing improved accuracy in measuring dimensional stability of film with the use of the moire method. In this technique, a halftone image is photographed onto the film to be tested by contact printing the film with a master halftone glass plate, and superimposing upon the film to be tested a plate having a halftone image similar to that of the master plate, but which image is "off size" or "enlarged" as compared to the image on the master plate. In the plate with the enlarged image, the distance between adjacent halftone dots is greater, say, by a magnitude of 0.17 of one percent, than that found in the master halftone glass plate. While not described in the article, such enlarged plates heretofore might be made by forming a photographic image of the master halftone plate upon an intermediate film, thereafter enlarging the spacing between the halftone dots on the intermediate film by subjecting the intermediate film to a highly humid atmosphere to cause the film to expand, and contact printing the enlarged halftone image onto a glass plate which may be registered or superimposed upon the film to be tested. While this technique gives satisfactory results, some error in measuring the dimensional stability of film is introduced as a result of the intermediate film expanding non-uniformly, and thereby providing the film with a halftone pattern wherein the distances between adjacent halftone dots or lines are not uniform.

It is also known in the art, as described in the articles by Arthur Fruwirth, "The Diffraction Theory of Half-Tone,38 The American Photo-Engraver, Jan., 1935 through May, 1936, to employ a diffraction method for producing halftone negatives for printing plates. In the method described by Fruwirth, a process camera is used to produce a halftone pattern on a filmstrip or plate by placing a crossline screen between the filmstrip and the aperture of the camera. Light such as from a mercury vapor light bulb is focused by the camera's lens, directed through the aperture toward the crossline screen, and diffracted onto the film or plate.

SUMMARY OF THE INVENTION

The invention provides a process for photographically producing from a master halftone "screen" an enlarged halftone image on a photographically sensitized element, i.e., plate or film, and the improved plates or films having enlarged halftone patterns produced by said process. To produce such plates or films, the invention proposes that a sensitized plate or film be placed at a small distance from a master screen and be exposed through the screen by substantially monochromatic light, which light emanates from a point light source. The invention further proposes that distortion due to sag in the plate or film be reduced by mounting the plate or film and screen in a vertical plane. The invention proposes that the exposure in question be achieved by use of ultraviolet light, the reason therefor to be described in detail later.

Figure 1:
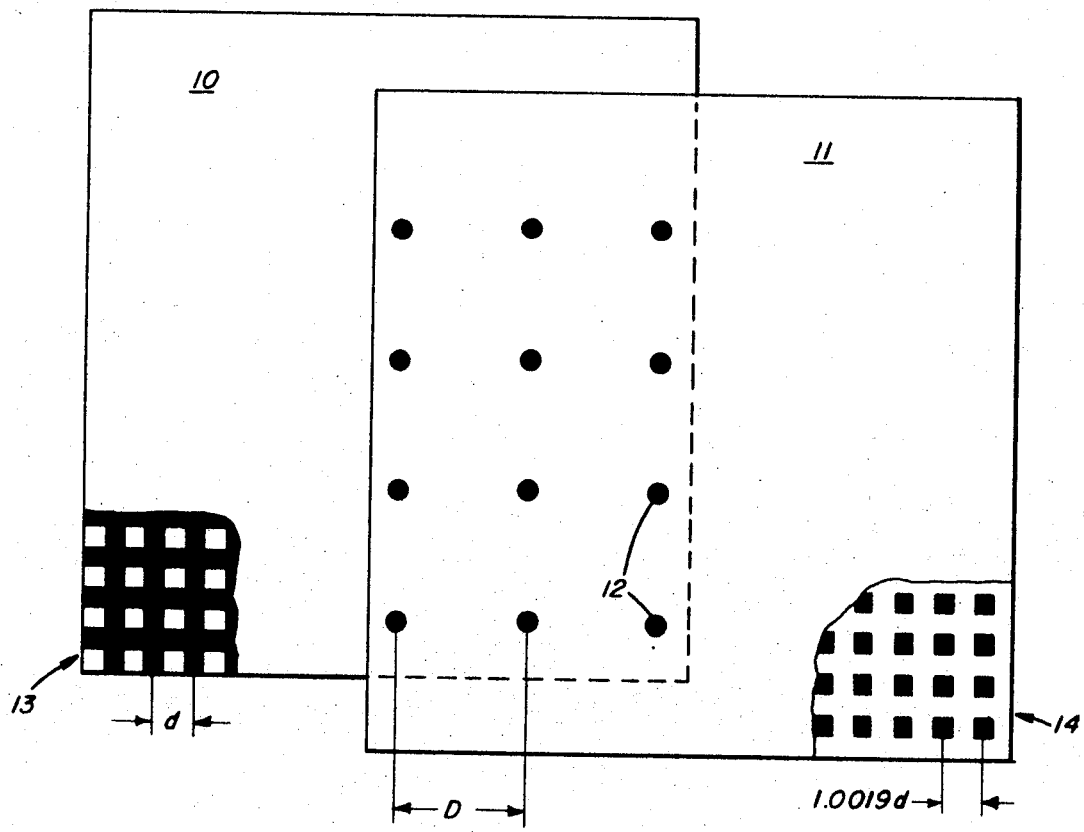
FIG. 1 depicts the use of the moire technique wherein an enlarged halftone plate or film is superimposed upon a film to be tested. A portion of each film or plate is magnified to illustrate the halftone pattern thereon.
Figure 2:
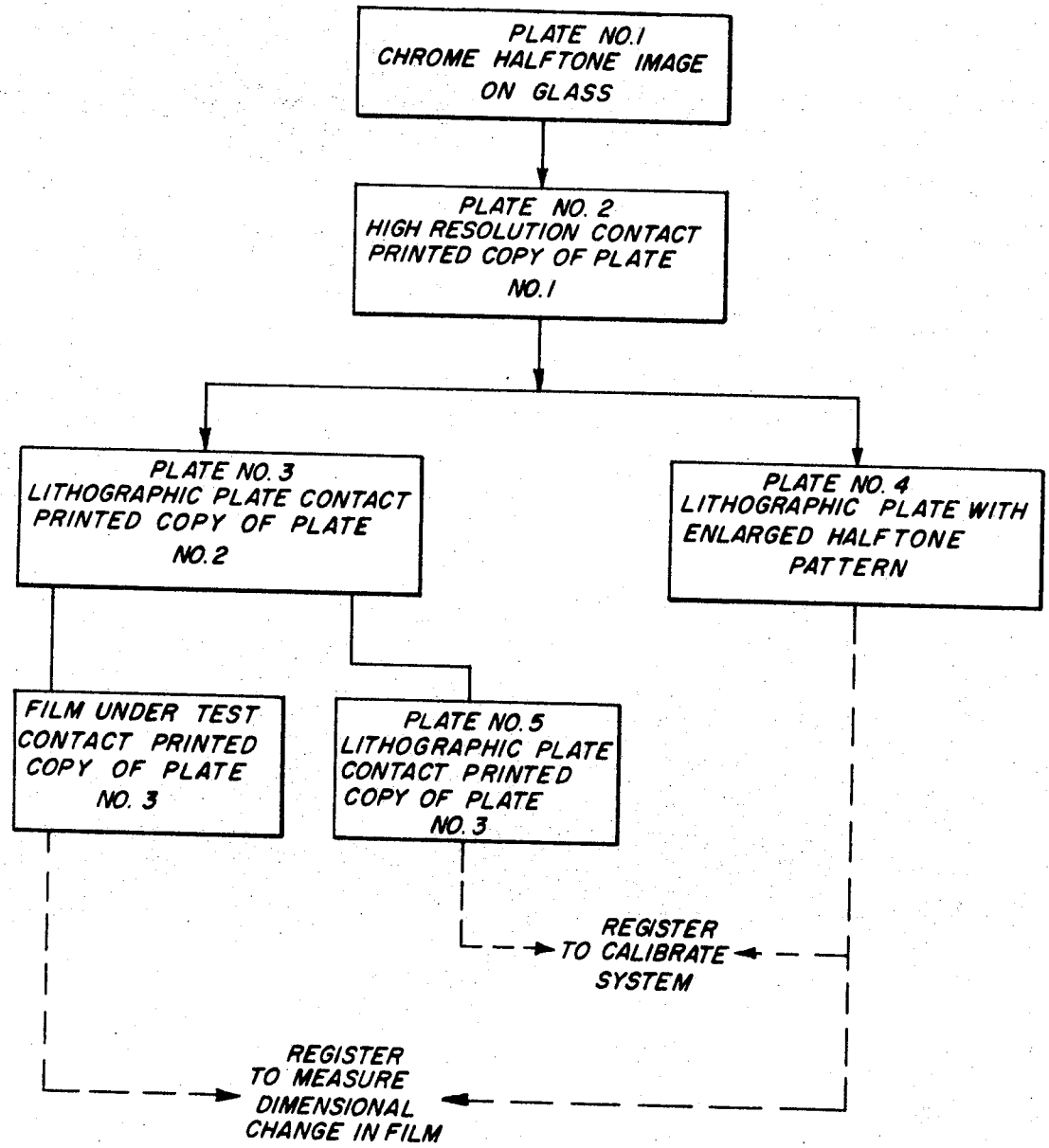
FIG. 2 depicts a flow chart describing the making and the using of enlarged halftone plates or film that are formed in accordance with the invention.

Reference should be had to the Figures: In the moire technique for determining the dimensional stability of photographic film, the film 10 to be tested may have imaged thereon a halftone pattern 13 wherein the distance $d$ between adjacent dot centers is, say, 0.001 inches. Superimposed upon the film is a plate or film 11 which also has imaged thereon a halftone pattern 14, which pattern preferably is a negative of the pattern 13. The pattern 14 further differs from the pattern 13 in that the spacing between adjacent dot centers is uniformly greater, say, by 1.0019 times than the corresponding distance $d$ of pattern 13. With the plate or film 11 superimposed upon the film 10, a pattern of moire dots 12 may be observed. The distance D between any two adjacent moire dots bears a relationship to the processing-produced dimensional change in the film 10 in accordance with the equation:

Percent dimensional change of Pattern 14 over Pattern 13 = $[0.0019 - d/D] \times 100$ With particular reference to FIG. 2, a series of steps is described which exemplifies the environment in which the invention is used. A commercially-available 12-inch square glass plate, denoted as Plate No. 1, has fabricated thereon a 10-inch by 10-inch crossline pattern formed in chrome. The plate has a pattern similar to that of the pattern 14, except that the distance between adjacent dot centers is $d$ which is preferably 0.001 inches. Plate No. 2 is a high-resolution glass plate, and is contact printed with Plate No. 1 to provide Plate No. 2 with the halftone pattern 13. A diapositive of the pattern on Plate No. 1 is contact printed on lithographic Plate No. 3 by contact printing Plate No. 3 with Plate No. 2. The film 10 to be tested for dimensional stability is then contact printed with Plate No. 3 to provide the halftone pattern 13. (The film 10 may be comprised of a polyethylene terephthalate support coated with a photographic emulsion.) The use of liquid chemical developing agents and uneven drying of the film 10 may tend to cause dimensional changes in the film. The extent of such changes may be accurately determined by the moire technique. A glass lithographic plate — Plate No. 5 — is also contact printed with Plate No. 3 for use in calibrating the system. As Plate Nos. 2, 3, and 5 are of glass, they are relatively dimensionally stable, and the halftone patterns photographed thereon are of the same spacing as that of Plate No. 1. Incidentally, in lieu of forming the halftone patterns on Plate Nos. 2, 3, and 5 by contact printing, it may be preferred to photograph the halftone image by the use of diffraction, wherein the plates on which an image is desired to be formed and the reference plate on which the image is present are separated by an extremely small distance, say, of 0.0007 inches so as to avoid the formation of Newton's rings and abrasion of the photographic emulsion. In addition, ionized air may be blown between the plates to minimize problems caused by dust.

Figure 3:
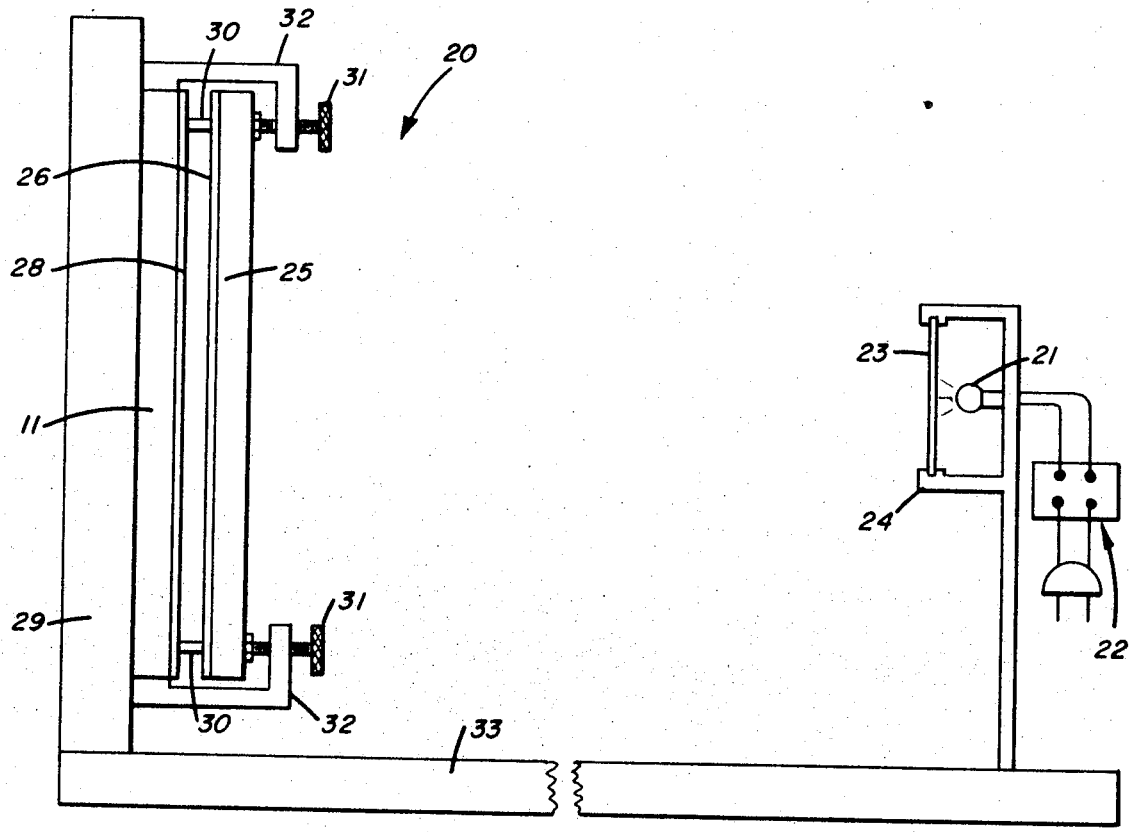
FIG. 3 is a view illustrating an apparatus for making enlarged halftone plates in accordance with the invention.

The procedural steps in going, in FIG. 3, from Plate No. 2 to a Plate No. 4 represents a key aspect of the invention: Plate No. 4 is photographed from Plate No. 2, but is so photographed as to provide an enlarged halftone pattern, like the pattern 14 of FIG. 1. With reference to FIG. 3, the enlarged halftone pattern on the plate 11 may be formed by mounting the plate in an apparatus 20. The apparatus 20 comprises a commercially-available point-light source 21 — preferably having an arc size of the order of 25 mils across — and a source of electrical power 22 coupled to the source 21. Light from the source 21 is filtered by an ultraviolet light filter 23 which is mounted on a support 24. The filter is of the type which is adapted to provide only a narrow band of ultraviolet light, say, in the proximate range of 3,400 to 3,800 angstrom units. Preferably, the band width is of the order of 200 angstrom units, but a 500 angstrom unit bandwidth may also be satisfactory. It should be understood, of course, that while the size of the bandwidth should be, as indicated above, relatively narrow, the bandwidth may be larger where the emulsion is sensitive to only a narrow portion thereof. The ultraviolet light is then used to image by diffraction the halftone pattern which appears in the layer 26 of a glass plate 25 (Plate No. 2) onto the photosensitized layer 28 of the glass plate 11 (Plate No. 4). The plates 25 and 11 are supported in the vertical direction by a vertical support 29 which is mounted on a horizontal support 33. The two plates have their respective layers 26,28 in facing relationship and spaced apart by the use of shims 30 a distance sufficient to permit an enlarged halftone pattern to be imaged onto the layer 28. The plates are clamped together by clamps 32 positioned at each corner of the plates, and the clamps may be tightened by clamp-screws 31. The point-light source 21 is so mounted as to be located on the central axis of the plates 25 and 11.

The source 21 is preferably located a distance of 73¼ inches from the photographically sensitive surface 28; and the surface 26 is then located, by the use of the shims 30, at a distance of 0.14 inches from the surface 28. The surface 26 has thereon a 1,000 lines per inch crossline pattern. It will be noted that the shims 30 are between the two layers 28 and 26, and this ensures that the spacing between the layers is equal to the height of the shims 30. A 0.19 percent enlargement of the pattern on the plates 25 may be obtained on the plate or film 11. Other shim spacings which provide satisfactory reproductions at the above-mentioned 73¼ inches distance are 0.060, 0.090, and 0.115 inches. Generally, the halftone image on the plate 11 will be larger than the original halftone image on the plate 25 by the ratio of the distance between the source 21 and the layer 28, divided by the distance between the source 21 and the layer 26. However, not all ratios will provide enlarged halftone patterns. For example, it has been found that at certain ratios a clear double image is formed wherein the distance between adjacent patterns is one-half that of the reference plate.

After exposing the photosensitive layer 28, via the pattern of the plate 25, with the narrow band of ultraviolet light for about 2 minutes, the latent image in the surface 28 is developed, thereby to produce the enlarged pattern 14 depicted in FIG. 1.

The plate of film 11 — Plate No. 4 in FIG. 2 — may then be registered with Plate No. 5 to check the accuracy of the system. When registered together, the Plate Nos. 4 and 5 should produce a moire pattern wherein the distance "D" between any two adjacent moire dots is governed by the relationship:

$$D = d^2/d' - d$$

$d'$ being the spacing between adjacent halftone dots or lines in the enlarged halftone pattern. Calibrated Plate No. 4 (11) may then be registered with the pattern in film 10 (which has been exposed via the Plate No. 3) as in FIG. 1, and the dimensional stability of the film determined in accordance with the known procedures as discussed above.

The advantage(s) of employing a narrow band of substantially monochromatic light to produce the Plate No. 4 is that a sharply defined image may be produced, whereas a fuzzy image may occur when bands larger than 500 angstrom units are used. The use of ultraviolet light has the advantage(s) that only a surface exposure on the photographically-sensitized emulsion surface, 28, will be obtained. This can be explained by the fact that gelatin — the conventional binder for photosensitized materials — is relatively opaque to ultraviolet light, and thus only those grains of photosensitive material which are actually at or near the surface will be exposed and a sharp image thereby obtained. In lieu of using ultraviolet light, sharp surface exposures may also be obtained by using substantially monochromatic light of wavelengths different from ultraviolet where the photosensitized layer 28 includes conventional dyes which absorb light in the region of the monochromatic light. In mounting the plates 11 and 25 in the vertical direction, distortion resulting from gravity causing the plates to sag at their centers is avoided and further increased accuracy obtained.

In addition to use of the invention in measuring the dimensional stability of films, a further use is in measuring the contour or flatness of a photographic element, e.g., the surface 28. Variance in the contour of the element of as little as 0.001 inches will provide in FIG. 3 a surface 28 that has an uneven focal plane, and the character of the image produced thereon will vary accordingly, and be measureable in relation to a uniform pattern or a flat surface by the use of the moire technique.

The invention has been described in detail with particular reference to preferred embodiments thereof, but it will be understood that variations and modifications can be effected within the spirit and scope of the invention.

What is claimed is:

1. A method of forming an enlarged halftone-like pattern on a photographically sensitized layer of a photographic element from a master element, the master element comprising a transparent support and a surface having a relatively smaller halftone-like pattern formed thereon, which method comprises the steps of:
   a. providing a point source of light,
   b. mounting said master element in spaced relationship from said source with the surface containing said halftone-like pattern facing away from said source of light,
   c. mounting said photographic element in parallel spaced relationship relative to said master element with said photographically sensitized layer facing toward both said source and said surface, the distance between said layer and said source and said surface and said source being such as to permit an enlarged image of said smaller halftone pattern to be formed by diffraction on said photographic element, and
   d. exposing said photographically sensitized layer through said master element with only substantially monochromatic light that has emanated from said source, said monochromatic light having a wavelength falling between 3,400 and 3,800 angstrom units.

2. A method of forming an enlarged halftone-like pattern on a photographically sensitized layer of a photographic element from a master element, the master element comprising a transparent support and a surface having a relatively smaller halftone-like pattern formed thereon, which method comprises the steps of:
   a. providing a point source of light,
   b. mounting said master element in spaced relationship from said source with the surface containing said halftone-like pattern facing away from said source of light,
   c. mounting said photographic element in parallel spaced relationship relative to said master element with said photographically sensitized layer facing toward both said source and said surface, the distance between said layer and said source and said surface and said source being such as to permit an enlarged image of said smaller halftone pattern to be formed by diffraction on said photographic element, and
   d. exposing said photographically sensitized layer through said master element with only substantially monochromatic light that has emanated from said source, said photographically sensitized layer including a dye which absorbs light in the region of the monochromatic light.

* * * * *